April 10, 1951
R. D. DREW
2,548,522
PROCESS FOR HEATING SOLID GRANULES
Filed Jan. 21, 1947
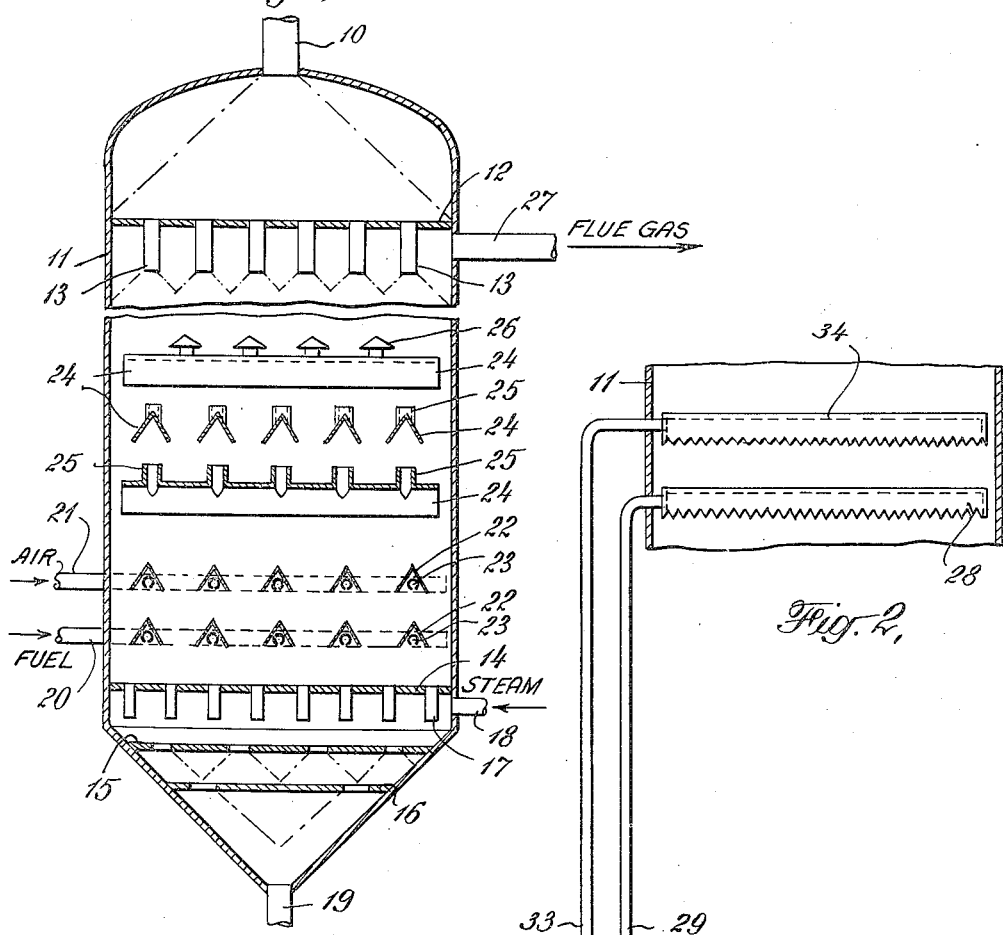
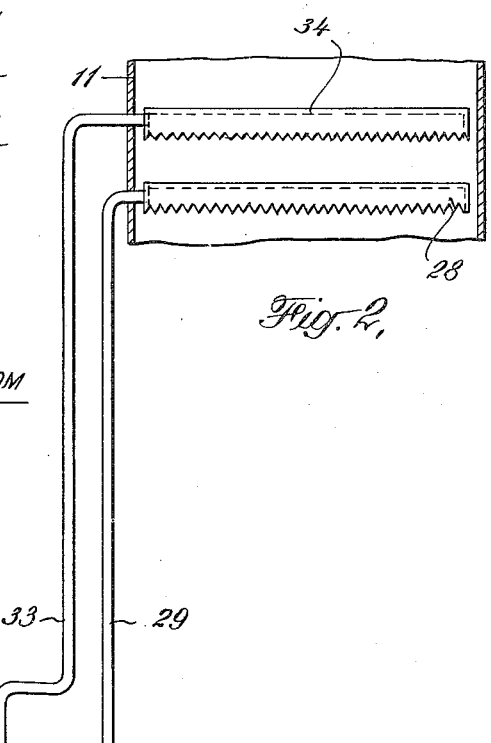
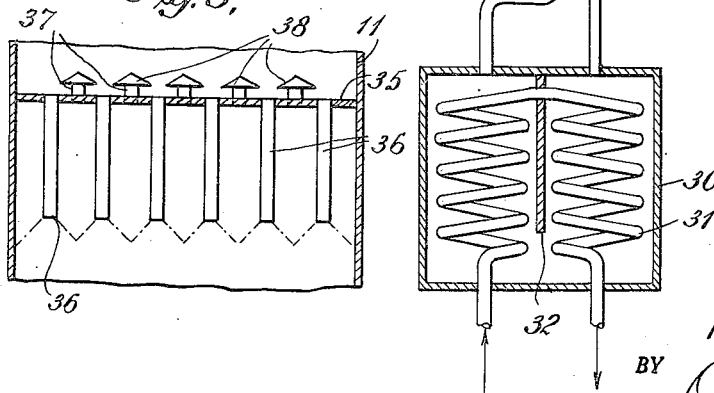
INVENTOR.
ROBERT D. DREW
BY
Oswald G. Hayes
ATTORNEY Patented Apr. 10, 1951

2,548,522

UNITED STATES PATENT OFFICE 2,548,522

PROCESS FOR HEATING SOLID GRANULES

Robert D. Drew, Wenonah, N. J., assignor to Socony-Vacuum Oil Company, Incorporated, a corporation of New York Application January 21, 1947, Serial No. 723,378

2 Claims. (Cl. 263—52)

This invention relates to apparatus for heating a solid granular heat transfer agent in order to provide for rapid and efficient heating of fluid reactants.

Heat exchange between a compact bed of granular solids and a fluid flowing therethrough is highly efficient and induces a very rapid change in temperature of the fluid under treatment. For many purposes such rapid change in temperature of a fluid reaction medium is highly desirable, as for example, in the cracking of fluid hydrocarbons to produce large yields of olefins. Thus gas oils are readily converted to obtain yields of 25-30% by weight of ethylene by reaction at temperatures in the neighborhood of 1500° F. from a reaction time of less than a second, say about 0.2 second. Successful operation requires some means for continuously supplying a highly heated granular solid to a compact moving bed through which the charge oil is passed. This invention is directed to a heater for supplying a continuous stream of granular solid heated to the desired degree.

A convenient method for heating granular solids continuously is to move the solids as a compact bed downwardly through a heating zone while passing a heating gas through the bed within said zone. The heating gas may be passed in any desired direction; however, the most efficient operation is obtained by passing the gases upwardly through a downwardly moving bed. This countercurrent contact brings the gases in contact with the coolest part of the bed just prior to discharge from the heating zone and results in exhaust gas at a minimum temperature level, thus utilizing a maximum proportion of the available heat in the heating gases.

Although the heating gases may be generated at a point outside the heating zone, it is preferable to generate the gases inside the moving bed by introducing fuel and air to the bed. By this means the heat is absorbed by the granular solid as it is released by combustion and the granules are not in contact with gases at the maximum temperature obtainable by combustion at any time. This avoids the necessity of diluting combustion gases generated at a remote point in order to avoid fusion of the granules. However, it does give rise to an operational difficulty in that the temperature of the burning gases is maintained relatively low and, in some cases, complete mixing of the fuel and air is not obtained. Both these effects result in incomplete combustion and the exhaust gases are then found to be high in carbon monoxide and other products of incomplete combustion as compared to products of complete combustion under the conditions prevailing in the heating zone. After discharge of the gases from the heating zone, the temperature is no longer held down by the heat exchange effect of the solid granules and combustion occurs in the exhaust flues. Excessive temperatures are thereby obtained in the exhaust flues which result in rapid destruction or serious damage to these elements.

The present invention provides a process and apparatus for avoiding this difficulty by disengaging the combustion gases from the compact bed at some point intermediate the ends thereof and thus permitting an increase in temperature of the combustion gases to a level at which the carbon monoxide and other combustibles are largely consumed. The combustion gases are then passed through a further portion of compact bed of granular solids for further heat exchange therewith and are then discharged to the flues in a condition which is not conducive to further combustion.

These and other objects and advantages of the invention will be apparent from consideration of apparatus for the stated purpose as shown in the annexed drawings wherein:

Figure 1 is a vertical section through a heater according to the present invention;

Figure 2 is a fragmentary section illustrating a modified intermediate section of the heater; and Figure 3 is a still further modification of the intermediate portion of the heater in accordance with the invention.

Referring now specifically to Figure 1, a granular solid heat transfer agent, such as fused alumina pellets, having an average diameter of about ⅓″, are supplied to the heater by an inlet pipe 10, mounted in the top of heater shell 11 which is, of course, suitably insulated to prevent loss of heat to the atmosphere. The granular solid falls onto a plate 12 which has suspended therefrom a number of feed tubes 13 through which the granular solid is distributed across the top of the heating zone. The granular solid moves downwardly through the shell 11 as a compact moving bed to a series of flow control plates 14, 15 and 16 in the lower part of the shell 11. These flow control plates have orifices arranged as shown in order to cause uniform withdrawal of the granular solids across the lower part of the bed. The orifices in plate 14 are fitted with tubes 17 which provide an open chamber above the solids lying on plate 15. Steam is preferably introduced to this space by a pipe 18 to purge residual gases from the granular solids. The hot solids are then transferred by line 19 to a suitable reactor or other apparatus wherein their heat is utilized.

Fuel and air are introduced to the lower part of the bed by supply pipes 20 and 21 through inlet angles 22 and inlet angles 23, respectively. The fuel mixes with air and burns as it passes upwardly through the bed in direct heat exchange relationship with the granular solids. Maximum flame temperatures are avoided because the heat released is rapidly taken up by the granular solids. This is an extremely efficient method of heating the granules, but it does not give wholly adequate mixing and it maintains the combustion mixture at a sufficiently low temperature that excessive amounts of combustible matter remain in the exhaust gases. If this excessive quantity of carbon monoxide and other combustible matter is discharged into the flues, it will combine with the residual oxygen to cause excessive temperatures in the flues thus damaging the same. In addition to the damage of apparatus, this involves a loss of potential heat units, thus requiring greater amounts of fuel for heating of the granular solid. According to the present invention, the combustion gases are disengaged from the compact bed and the temperature is permitted to rise in a zone where heat exchange with the granules is greatly diminished or even completely eliminated. Preferably, some heat exchange with the granules is maintained and I prefer that some temperature control be maintained at this stage in order to avoid the possibility of developing excessive temperatures which might result in fusion of granular solid when the gases are again introduced to the bed.

A preferred method of accomplishing this purpose is shown in Figure 1 wherein an intermediate portion of the bed is provided with baffling means which cause the upwardly moving gases to follow a tortuous, granular-free path or a plurality of such paths while the granules are baffled to portions of the bed outside such paths. Various arrangements of baffles for this purpose are known to the prior art as disclosed in Patent Number 2,227,416 issued December 31, 1940 to John W. Payne. One such arrangement is shown herein as a plurality of inverted troughs 24 formed of angle irons arranged in layers about as shown. The troughs of adjacent layers extend in different horizontal directions and the troughs of each layer are provided with chimneys 25. Each of the chimneys on the top layer is fitted with a conical cap 26 by means of which the combustion gases are reintroduced to the compact bed. The chimneys of lower troughs are arranged to open directly below the trough next above. In this manner the combustion gases are caused to enter the lower series of troughs, flowing for a short distance in the trough to a chimney from which they are diverted to the next higher trough. After flowing for a short distance along this trough and mixing with flows from other chimneys discharging to the same trough, the gases are again passed upwardly to the next higher trough. While within the trough, the gases are in direct contact with a bounding surface of the bed of granular solid, but no substantial amount of gas flows through the solids and heat exchange with the solids is at a minimum. The temperature of the gases rises rapidly and substantially complete combustion occurs. The highly heated gases are then reintroduced to the bed by means of the caps 26 and flow upwardly to the top of the bed below the bottoms of feed pipes 13. Here they enter the open space below plate 12 and are exhausted by pipe 27 to waste heat boilers and thence to the stack.

In the embodiment of Figure 2, the combustion gases are disengaged from the compact bed by a plurality of collecting troughs 28 and passed by pipe 29 to a combustion chamber 30 isolated from the heating zone. As shown, the combustion chamber 30 is fitted with a coil 31 through which a suitable medium is circulated to prevent development of excessive temperature and with a baffle 32. The heat control medium circulated through coil 31 is so adjusted that the temperature of the gases in combustion chamber 30 is permitted to rise to a level which will result in substantially complete combustion and the hot gases are then returned by pipe 33 to a series of distribution troughs 34 within the shell 11.

The embodiment of Figure 3 is somewhat similar to that of Figure 1 in effect since the chamber in which temperature rise occurs is in heat exchange relationship with the granules. In this case, however, the heat exchange is indirect. A plate 35 is provided at an intermediate point in the shell 11 and fitted with a number of feed legs 36 through which the granular solids pass to the lower part of the heating zone. The combustion gases rising within shell 11 are disengaged at the upper surface of the bed below feed legs 36 and their temperature rises in an open space about the feed legs 36 in indirect heat exchange relationship with the granules in feed legs 36. Highly heated gases are again introduced to the bed through chimneys 37 fitted with caps 38.

The advantages of the invention are well illustrated by comparison of two experimental runs. The heater corresponded generally to that shown in Figure 1, having means to separately introduce fuel gas and air to the bottom of a moving bed of granular solids. In one run, the stacked angles were employed for the purposes stated above, while the comparative run was made in the same apparatus under identical conditions except that the angular baffles were removed before the run was made. Refractory granules at about 900° F. were supplied at the same rate in both runs and throughout both runs, a mixture of air and a refinery $C_3$ cut (predominantly propane and propylene) approximating the ratio for complete combustion was formed in the bed by supplying the two gases separately at constant rates. The results are tabulated below:

| Exhaust gas | With baffles | Without baffles |
| --- | --- | --- |
| $CO_2$ ------per cent by volume-- | 10.5 | 5.0 |
| $O_2$ ------do---- | 1.5 | 9.5 |
| $CO$ ------do---- | 0.5 | 1.0 |
| $H_2$ ------do---- | 0.5 | 1.5 |
| hydrocarbon ------do---- | 0.5 | 7.5 |
| Exit Temp. of solids ------° F-- | 1,500 | 1,250 |

I claim:

1. A process for heating granular solids which comprises admitting said solids to the top of an enclosed vertical heating zone, withdrawing said solids in heated condition from the bottom of said zone, deflecting said solids intermediate the point of said admission and the point of said withdrawal to provide an intermediate region characterized by open space substantially free of said solids between an upper moving bed of compact solids thereabove and a lower moving bed of compact solids therebelow, introducing fluid fuel and air to one end of said zone to produce a flame therein, passing the resultant burning mixture through that one of said moving beds adjacent the end of such introduction toward said intermediate region, disengaging said mixture from the moving bed into said open space to thereby permit rapid rise in temperature of said mixture out of intimate heat exchange contact with said solids and thus obtain more complete combustion of said fuel, transferring the said mixture so increased in temperature from said open space to the other of said moving beds, passing said mixture through said last named bed from said open space toward the end of said zone remote from the point of introducing fuel and air and discharging spent combustion mixture from the last named end of said zone.

2. The process of claim 1 wherein said fuel and air are introduced to the bottom of said zone to pass upwardly through said beds countercurrent to the movement of said solids therein and through said open space and said spent combustion mixture is discharged from the top of said zone.

ROBERT D. DREW.

REFERENCES CITED

The following references are of record in the file of this patent:

UNITED STATES PATENTS

| Number | Name | Date |
|---|---|---|
| Re. 23,087 | Bailey | Mar. 8, 1949 |
| 2,226,578 | Payne | Dec. 31, 1940 |
| 2,331,433 | Simpson | Oct. 12, 1943 |
| 2,399,450 | Ramseyer | Apr. 30, 1946 |
| 2,409,707 | Roetheli | Oct. 22, 1946 |
| 2,519,315 | Johnson et al. | Aug. 15, 1950 |